US010223600B2

(12) United States Patent
Fischer et al.

(10) Patent No.: US 10,223,600 B2
(45) Date of Patent: Mar. 5, 2019

(54) METHOD AND DEVICE FOR RECOGNIZING TRAFFIC SIGNS FOR A VEHICLE

(71) Applicant: Conti Temic microelectronic GmbH, Nürnberg (DE)

(72) Inventors: Marc Fischer, Nonnenhorn (DE); Peter van der Vegte, Friedrichshafen (DE); Ulrich Möller, Holzkirchen (DE)

(73) Assignee: Conti Temic microelectronic GmbH, Nürnberg (DE)

( * ) Notice: Subject to any disclaimer, the term of this patent is extended or adjusted under 35 U.S.C. 154(b) by 191 days.

(21) Appl. No.: 14/427,427

(22) PCT Filed: Oct. 21, 2013

(86) PCT No.: PCT/DE2013/200238
§ 371 (c)(1),
(2) Date: Mar. 11, 2015

(87) PCT Pub. No.: WO2014/071939
PCT Pub. Date: May 15, 2014

(65) Prior Publication Data
US 2015/0220795 A1 Aug. 6, 2015

(30) Foreign Application Priority Data

Nov. 6, 2012 (DE) .................. 10 2012 110 595

(51) Int. Cl.
*G06K 9/00* (2006.01)
*G01S 13/93* (2006.01)
*G06K 9/62* (2006.01)
*B60R 1/00* (2006.01)

(52) U.S. Cl.
CPC ............ *G06K 9/00818* (2013.01); *B60R 1/00* (2013.01); *G01S 13/931* (2013.01); *G06K 9/00825* (2013.01); *G06K 9/6293* (2013.01); *G01S 2013/9321* (2013.01); *G01S 2013/9339* (2013.01); *G01S 2013/9357* (2013.01); *G01S 2013/9367* (2013.01)

(58) Field of Classification Search
None
See application file for complete search history.

(56) References Cited

U.S. PATENT DOCUMENTS

| 6,414,712 B1 * | 7/2002 | Wanielik | G01C 21/28 348/118 |
|---|---|---|---|
| 6,670,912 B2 | 12/2003 | Honda | |
| 6,801,638 B1 * | 10/2004 | Janssen | B60K 35/00 340/910 |
| 8,953,842 B2 | 2/2015 | Zobel | |
| 2008/0042812 A1 * | 2/2008 | Dunsmoir | G06K 9/00805 340/435 |
| 2008/0243378 A1 * | 10/2008 | Zavoli | G01C 21/28 701/533 |
| 2009/0228204 A1 | 9/2009 | Zavoli et al. | |
| 2010/0007728 A1 | 1/2010 | Strauss | |
| 2010/0283855 A1 * | 11/2010 | Becker | G06K 9/6807 348/148 |
| 2011/0222732 A1 | 9/2011 | Higuchi | |
| 2014/0063232 A1 * | 3/2014 | Fairfield | G06K 9/78 348/118 |

FOREIGN PATENT DOCUMENTS

| DE | 10200784 | 7/2003 |
|---|---|---|
| DE | 102009013326 | 11/2009 |
| DE | 102008043743 | 5/2010 |
| DE | 102010020330 | 11/2011 |
| EP | 2629237 | 8/2013 |
| JP | 2000501835 A | 2/2000 |
| JP | 2002189075 A | 7/2002 |
| JP | 2008286566 A | 11/2008 |
| JP | 2011511281 A | 4/2011 |
| JP | 2012198774 A | 10/2012 |

OTHER PUBLICATIONS

German Search Report dated Aug. 27, 2013 for German Application No. 10 2012 110 595.2, including partial translation.
International Search Report for International Application No. PCT/DE2013/200238 dated Feb. 18, 2014.
International Preliminary Report on Patentability for International Application No. PCT/DE2013/200238 dated May 7, 2015.
Notification of Reasons for Refusal for Japanese Application No. 2015-540048, dated Jun. 13, 2017, including English translation, 7 pages.

* cited by examiner

Primary Examiner — Heather R Jones
(74) Attorney, Agent, or Firm — RatnerPrestia

(57) ABSTRACT

The invention provides a method and a device for recognizing traffic signs by a sensor system for recording the surrounding environment for a vehicle, which includes at least one camera sensor and one radar sensor or LiDAR sensor. Based on the data of the at least one radar sensor or LiDAR sensor, at least one element of the presence of a traffic sign, or the size of a traffic sign, position of a traffic sign, distance and/or orientation of a traffic sign, bridge-like structure, position and/or type of the vehicle ahead, position of lane delimiting structures is obtained and used for traffic sign recognition.

11 Claims, No Drawings

METHOD AND DEVICE FOR RECOGNIZING TRAFFIC SIGNS FOR A VEHICLE

CROSS REFERENCE TO RELATED APPLICATIONS

This application is the U.S. National Phase Application of PCT/DE2013/200238, filed Oct. 21, 2013, which claims priority to German Patent Application No. 10 2012 110 595.2, filed Nov. 6, 2012, the contents of such applications being incorporated by reference herein.

BACKGROUND OF THE INVENTION

Radio-based systems for traffic sign recognition are state of the art. A traffic sign transmits its meaning and, if appropriate, its position by radio to a radio receiver within the vehicle.

An alternative approach to traffic sign recognition has already been implemented in production vehicles. Traffic signs are recognized by means of a camera sensor system within the vehicle. Such systems can be supported by a navigation system including an electronic map. Traffic sign recognition (TSR) by means of a camera system is based on two essential steps. Step 1 is the search for circular structures (e.g. speed limits) or rectangular structures (e.g. town signs). When suitable candidates have been detected, they are then classified in a subsequent step. For example, numbers are identified using pattern recognition.

SUMMARY OF THE INVENTION

An aspect of the present invention is to improve the function of a system for traffic sign recognition which is based on data of a camera sensor system.

DETAILED DESCRIPTION OF THE PREFERRED EMBODIMENTS

It is an aspect of the invention that traffic sign recognition based on a camera system be supported by information of a radar or LiDAR sensor system. Sensor systems which can be used for this purpose include, in particular, those used for an ACC function or an emergency braking function. Based on the data of a radar sensor or LiDAR sensor, at least one element of the following information
  the presence of a traffic sign or
  the size of a traffic sign
  position of a traffic sign
  distance and/or orientation of a traffic sign
  bridge-like structure, in particular a gantry
  position or type of the vehicle ahead, in particular a truck
  position of lane delimiting structures
is obtained and used for traffic sign recognition.

In a preferred embodiment of the invention, the at least one piece of information obtained from radar or LiDAR data is used to check the plausibility of data provided by the camera sensor.

When a traffic sign or a potential traffic sign is detected by means of radar, the TSR unit can be informed of this fact. The information (presence, distance, size, orientation, etc.) can then be used there to make a plausibility check.

Another positive embodiment of the invention includes image processing for the analysis of camera data in such a manner that an area where information according to a)-e) has been recorded is specifically searched for traffic signs. This can e.g. be done by a more detailed analysis of the image data with an increased (computational) intensity, or by means of a targeted search for combined structures or patterns or colors which have been stored in a memory and are typical of the shape and contents of traffic signs. In particular, the stored templates can be selected according to country. The information relating to the country can be provided by a navigation device or via radio systems (c2x, broadcast, traffic reporting) or by a sensor which records the surrounding environment. The latter may e.g. be a camera sensor which is designed for traffic sign recognition. This approach ensures that no traffic sign is overlooked.

Another positive embodiment of the invention includes image processing for the analysis of camera data in such a manner that only an area where information according to a)-e) has been recorded is searched for traffic signs. This approach saves computation time during the analysis of the image data of a camera system, or, as the computation time which is available for data processing is limited, the camera data relating to traffic signs in the specified areas can be analyzed better by making more intensive use of the computation time.

In another positive embodiment of the invention either of the elements of the information under c) or d) is analyzed to determine the area where a traffic sign is valid. This is, in particular, done when there are several traffic lanes in the surrounding environment of the vehicle. A radar or LiDAR sensor system can be used to detect lane delimiting structures (e.g. guard rails) g). Traffic signs detected by a radar or LiDAR sensor system can be allocated to these structures in terms of space. This can, in particular, serve as a feature for a plausibility check which is aimed at disregarding or confirming potential traffic signs, depending on the position of these potential traffic signs relative to the lane delimiting structures. In particular, distance or position information can be used for such an allocation. In particular in the case of multi-lane carriageways, junctions, parallel roads, etc., the position of the traffic sign decides to which lane, road, etc. it belongs. If the location of the traffic sign is known, one can determine its relevance to one's own traffic lane. For example, distant signs can be disregarded if they do not belong to the own traffic lane.

A preferred embodiment of the invention includes image processing for the analysis of camera data in such a manner that an area where information according to f) has been recorded is not searched for traffic signs.

A radar or LiDAR sensor system is used to detect vehicles ahead, in particular trucks, and this information is provided to the traffic sign recognition unit. This is e.g. useful in the case of vehicles which have information in the form of speed limits on their rear end. Such information is not valid for other road users.

Preferably, the presence of a traffic sign is detected on the basis of data provided by a radar or LiDAR system, depending on at least one of the following parameters:
  Position of the object; traffic signs are, in particular, arranged on the roadside or above the carriageway or the traffic lane. In addition or as an alternative, the position information can be correlated with navigation data. It can e.g. be assumed that there are a higher number of traffic signs near crossings.
  Distance, in particular to determine the relevance of a traffic sign to one's own traffic lane.
  Intensity of the radiation reflected on an object or parameters which can be deduced therefrom, such as the radar or LiDAR backscatter cross section; due to the material they are made of (usually metal), traffic signs are good reflectors, i.e. they can be detected from the fact that the backscatter cross section or the intensity of reflection must be above a predefined threshold or lie within a predefined value range.

Relative speed; traffic signs are stationary objects, so that they can be detected from the fact that their relative speed must be the same as the vehicle speed or their relative speed to other non-moving objects, e.g. guard rails, must be zero.

Dimensions of the object; as traffic signs have standard sizes, only an object whose dimensions lie within a predefined value range can be a traffic sign. The predefined value range can, in particular, depend on further information, e.g. the position of the traffic signs. In particular, gantries are stationary objects which have relatively large dimensions and are located above the carriageway.

In a positive embodiment of the invention, objects are recognized as potential traffic signs on the basis of radar or LiDAR data; in addition, these objects are allocated a probability value which indicates the probability that the relevant object could be a traffic sign.

Preferably, information relating to the position of the object is, in addition, correlated with information provided by a navigation system in order to determine the probability. In particular, there is a higher probability of traffic signs near crossings.

The invention claimed is:

1. A method for recognizing traffic signs by a sensor system for recording the surrounding environment for a vehicle, which comprises a processor in the vehicle, at least one camera sensor in the vehicle and one radar sensor or LiDAR sensor in the vehicle, the method comprising:
   detecting, by the at least one radar sensor or LiDAR sensor, at least one of the following:
   a) the presence of a traffic sign,
   b) the size of a traffic sign,
   c) position of a traffic sign,
   d) distance and/or orientation of a traffic sign,
   e) bridge-like structure,
   f) position or type of the vehicle ahead,
   g) position of lane delimiting structures;
   allocating, by the processor, a probability to the presence of a traffic sign detected by the at least one radar sensor or LiDAR sensor, the probability being determined by correlating at least one of a)-g) with roadway location information provided by a navigation system;
   capturing, by the at least one camera sensor, an image of the traffic sign;
   determining, by the processor, plausibility of the traffic sign captured in the image being relevant to a roadway that the vehicle is traveling on based on the allocated probability of the information detected by the at least one radar sensor or LiDAR sensor;
   determining a roadway to which the traffic sign belongs;
   using, by the processor, the traffic sign when controlling the vehicle, when the processor determines that the roadway that the vehicle is traveling is the same as the roadway to which the traffic sign belongs; and
   disregarding, by the processor, the traffic sign when controlling the vehicle, when the processor determines that the roadway that the vehicle is traveling is different from the roadway to which the traffic sign belongs.

2. The method according to claim 1, wherein the at least one piece of information obtained from radar or LiDAR data is used to check the plausibility of data provided by the camera sensor.

3. The method according to claim 1, further comprising image processing for the analysis of camera data in such a manner that an area where information according to a) e) has been recorded is specifically searched for traffic signs.

4. The method according to claim 1, further comprising it includes image processing for the analysis of camera data in such a manner that only an area where information according to a)-e) has been recorded is searched for traffic signs.

5. The method according to claim 1, wherein either of the elements of the information under c) or d) is analyzed to determine the area where a traffic sign is valid.

6. The method according to claim 1, further comprising image processing for the analysis of camera data in such a manner that an area where information according to f) has been recorded is not searched for traffic signs.

7. The method according to claim 1, wherein a traffic sign is recognized on the basis of data provided by a radar or LiDAR system, depending on at least one of the following parameters:
   position of the object
   distance
   intensity of reflection
   relative speed
   dimensions of the object.

8. The method according to claim 1, wherein objects are recognized as potential traffic signs on the basis of data provided by a radar or LiDAR sensor, wherein these objects are allocated a probability value which indicates the probability that the relevant object is a traffic sign.

9. The method according to claim 1, wherein at least one element of the information under a)-e) is used to check the plausibility of data provided by the camera sensor.

10. The method according to claim 1, wherein either of the elements of the information under c) or d) is analyzed to determine the area where a traffic sign is valid when there are several traffic lanes in the surrounding environment of the vehicle.

11. A device for a vehicle for recognizing traffic signs, comprising:
   a radar or LiDAR sensor system;
   a camera sensor system; and
   a processor,
   wherein the radar sensor or LiDAR sensor is configured to detect at least one of the following:
   a) the presence of a traffic sign,
   b) the size of a traffic sign,
   c) position of a traffic sign,
   d) distance and/or orientation of a traffic sign,
   e) bridge-like structure,
   f) position or type of the vehicle ahead,
   g) position of lane delimiting structures,
   wherein the camera sensor is configured to capture an image of the traffic sign, and
   wherein the processor is configured to:
   allocate a probability to the presence of a traffic sign detected by the radar sensor or LiDAR sensor, the probability being determined by correlating at least one of a)-g) with roadway location information provided by a navigation system, and
   determine a plausibility of the traffic sign captured in the image being relevant to a roadway that the vehicle is traveling on based on the allocated probability of the information detected by the radar sensor or LiDAR sensor;
   determine a roadway to which the traffic sign belongs;

use the traffic sign when controlling the vehicle, when the processor determines that the roadway that the vehicle is traveling is the same as the roadway to which the traffic sign belongs; and disregard the traffic sign when controlling the vehicle, when the processor determines that the roadway that the vehicle is traveling is different from the roadway to which the traffic sign belongs.

\* \* \* \* \*